United States Patent [19]
Hosaka et al.

[11] 3,852,717
[45] Dec. 3, 1974

[54] DEVICE FOR AUTOMATICALLY DETECTING ABNORMAL CONDITIONS IN VEHICLE TIRES

[75] Inventors: Akio Hosaka, Yokohama; Kiyoshi Wazawa, Fujisawa, both of Japan

[73] Assignee: Nissan Motor Company Limited, Yokohama City, Japan

[22] Filed: Nov. 1, 1972

[21] Appl. No.: 302,721

[30] Foreign Application Priority Data
Nov. 22, 1971 Japan.............................. 46-93825

[52] U.S. Cl................ 340/58, 73/146.5, 200/61.22, 340/57
[51] Int. Cl............................................ B60c 23/02
[58] Field of Search ................ 340/58, 57, 60, 228; 200/61.22, 61.25; 73/146.5, 146.8

[56] References Cited
UNITED STATES PATENTS

| | | | |
|---|---|---|---|
| 2,894,246 | 7/1959 | De Graffenried..................... | 340/58 |
| 3,093,812 | 6/1963 | Brown.................................. | 340/58 |
| 3,281,784 | 10/1966 | Farthing............................. | 200/61.25 |
| 3,370,459 | 2/1968 | Cescati ............................. | 73/146.5 |
| 3,614,732 | 10/1971 | Lejeune.............................. | 340/58 |
| 3,662,335 | 5/1972 | Fritze................................ | 200/61.25 |
| 3,665,387 | 5/1972 | Enabnit.............................. | 340/58 |

*Primary Examiner*—John W. Caldwell
*Assistant Examiner*—Joseph E. Nowicki

[57] ABSTRACT

A pressure switch and a PTC (Positive Temperature Coefficient) thermistor acting as a temperature switch, which are mounted within the tire assembly to detect certain abnormal conditions in the tire, such as too low air pressure and excessive tire temperature. Both switchs are connected in series to an electromagnetic coupling unit comprising a primary coil and a secondary coil. The secondary coil is secured concentrically on an axle of the vehicle for rotation therewith. The primary coil is secured rigidly on the journal member of the axle in concentric relation with the secondary coil, so that when the abnormal conditions occur, the primary coil exhibits a marked inductance increase. In response to the marked inductance increase, a detector unit produces a voltage signal which is supplied to an alarm lamp or buzzer for the driver's attention.

3 Claims, 9 Drawing Figures

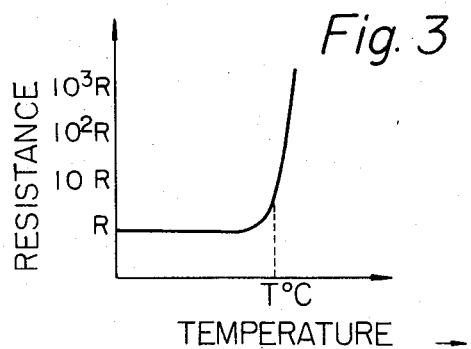
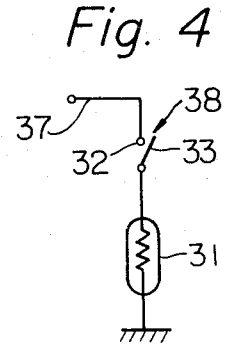
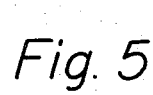
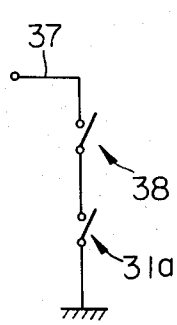
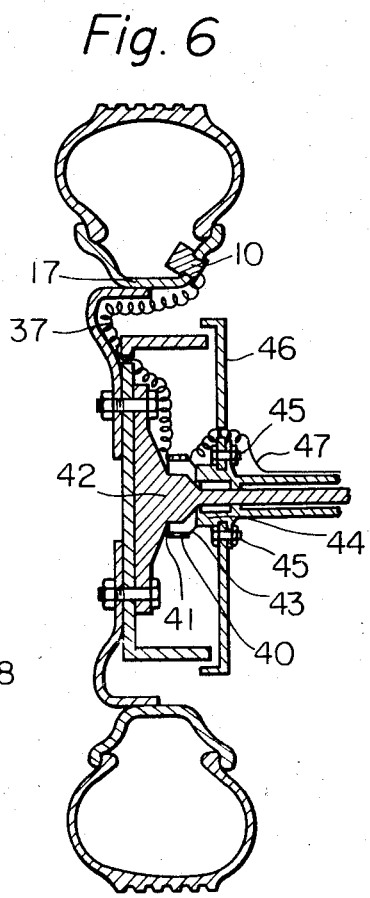
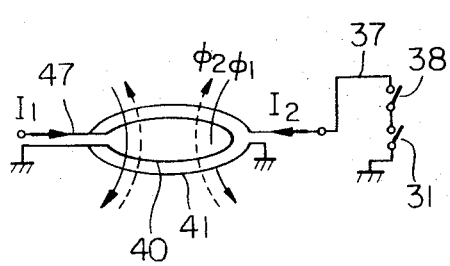

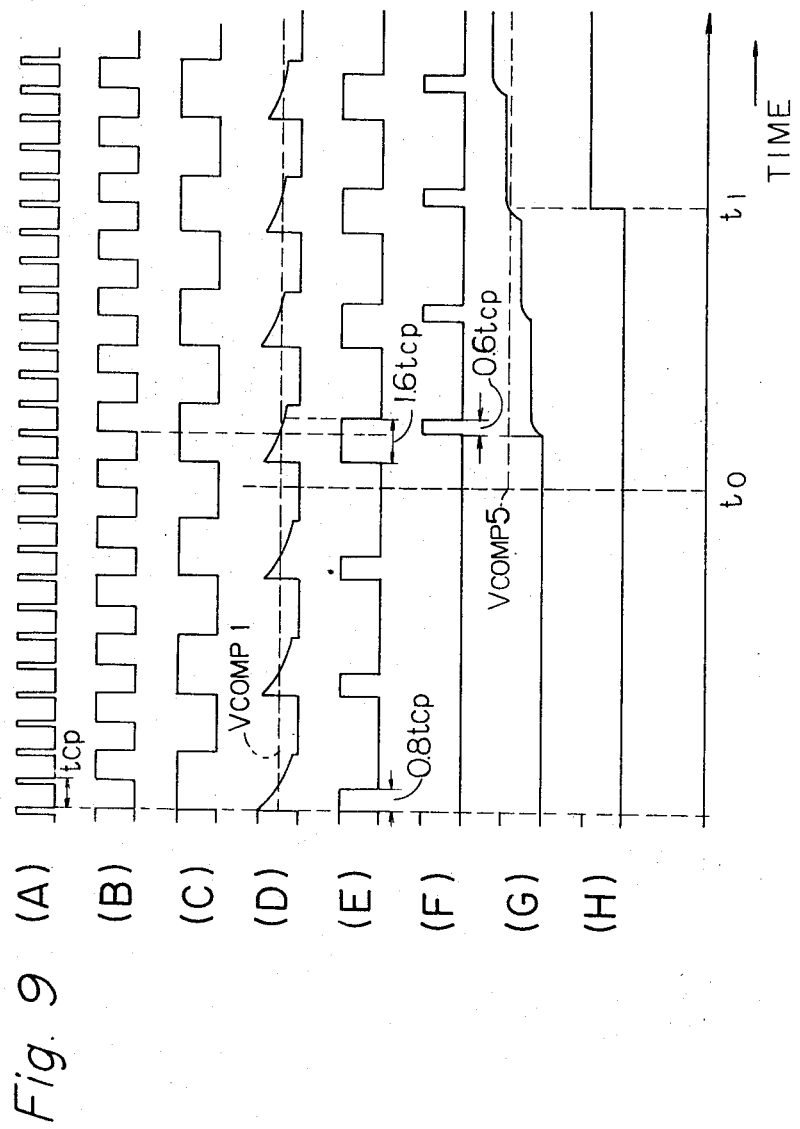

DEVICE FOR AUTOMATICALLY DETECTING ABNORMAL CONDITIONS IN VEHICLE TIRES

This invention relates to an improved device that permits automatic detection of certain abnormal conditions in vehicle tires, such as too low air pressure and excessive tire temperature, to give a warning to the driver.

In order that the vehicle tires perform their essential functions, it is important to maintain a proper pressure in the tires. Low pressure will cause not only hard steering, but also uneven tread wear resulting in decreased service life. A tire with insufficient pressure will tend to induce "standing waves" during high speed driving, as a result of which the tire is deformed polygonally. The insufficient air pressure will also cause a "hydroplanning" phenomenon during driving in rainy weather. Both of these unusual phenomena often cause accidents. Still further, a tire with improper pressure, is excessively heated due to the occurrence of the "standing waves" or the like and becomes most dangerous in that a blowout is liable to occur.

It is a usual practice for the driver to empirically judge when the tires are underinflated by the "feeling" of steering. However, this judgement will inevitably be inaccurate. Further, it is impossible to detect the tire temperatures except by touching the tires after the vehicle comes to a complete stop.

Various methods of detecting abnormal conditions in vehicle tires have heretofore been proposed and demonstrated. One method of detecting the air pressure is by the use of a pressure switch so that a deviation from a proper value is sensed magnetically or electromagnetically. However, in devices of this type, the pressure switch is inevitably complicated in construction and is liable to malfunction due to the centrifugal force applied thereto. Further, since these divices are adapted to sense magnetically or electromagnetically every revolution of each tire, such sensing does not take place while the vehicle stops or is moving slowly. In addition, the extremely complcated circuitry for processing pressure signals from the pressure switch makes the devices of this type impractical.

Therefore, it is an object of the present invention to provide a new and improved device for detecting certain abnormal conditions in vehicle tires, without the detection being affected by the centrifugal force and irregularities of the road.

Another object of the invention is to provide an improved device of the above-described type that is capable of detecting certain abnormal conditions in tires even when the vehicle stops.

It is a further object of the invention to provide an improved device of the above-described type which is adapted to detect an excessive increase in tire temperature.

These and other objects will be readily apparent from the following description of embodiments of the invention when read in conjunction with the accompanying drawings, in which:

FIG. 3 shows the resistance-temperature characteristics of a thermistor used as a temperature switch;

FIG. 4 is a circuit diagram of the sensor unit shown in FIG. 2;

FIG. 5 is an equivalent circuit of the sensor;

FIG. 6 is a sectional view showing the manner in which the electromagnetic coupling unit and the sensor unit are mounted on the axle and the wheel rim, respectively;

FIG. 7 is a view explaining how a change of inductance occurs during the abnormal conditions of a tire;

FIG. 9 is a graphical illustration of the waveforms appearing at various points in the circuit of FIG. 8.

In general, the air pressure in a tire increases proportionately as the tire temperature increases. Thus, if the air pressure is adjusted to a specified value with the tire temperature high, for instance, after fast driving on a highway, then when the tire cools off, the pressure will be too low. The reason for this is that pressures specificed by the manufacturers are for cold tires. According to the teachings of the present invention, the tire temperature as well as the air pressure is sensed to detect abnormal conditions in the tires. By the "abnormal conditions" appearing in the specification is meant that the air pressure in a tire is below a predetermined value, that is, the specified "cold-tire" pressure and/or that the tire temperature is excessively above a predetermined value.

Figure 1:
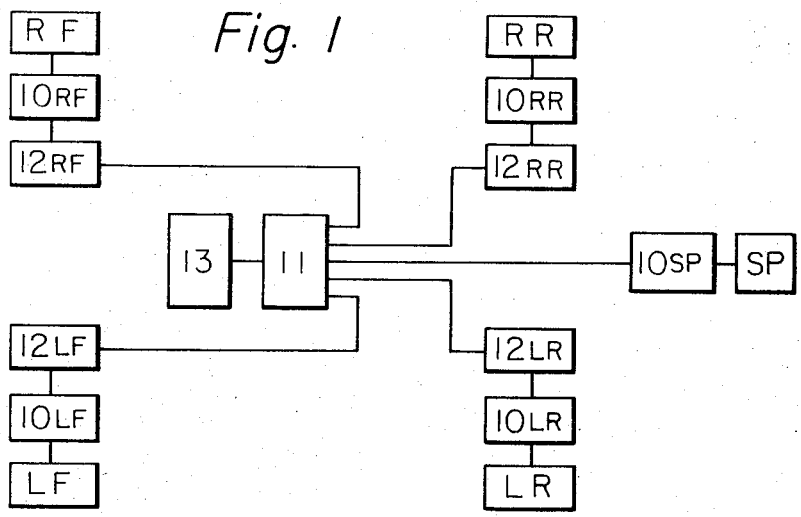
FIG. 1 is a block diagram of one embodiment of the present invention as applied to four tires and one spare tire of a four wheeled vehicle.

Referring now to FIG. 1, there is shown a preferred embodiment of the invention which is used for automatic detection of abnormal conditions in the tires of a four wheeled vehicle. The vehicle tires are indicated at RF (right front), RR (right rear), LF (left front) and LR (left rear) in line with their respective locations. Abnormal conditions of the spare tire, indicated at SP, are also detectable by the device of FIG. 1. Each of the five tires has a sensor unit or means 10 mounted thereon which is capable of sensing abnormal conditions in its corresponding tire, as will be described below in detail. These sensor units 10 are connected together to an inductance change detector means 11 through their corresponding electromagnetic coupling means or units 12, except for the sensor $10_{SP}$ asssociated with the spare tire (SP). The sensor $10_{SP}$ is directly connected to the inductance change detector 11, since there is no need for it to be electromagnetically coupled thereto due to the fact that the spare tire is secured rigidly with respect to the frame or body of the vehicle. The function of the inductance change detector 11 is to detect a change of the inductance of individual electromagnetic coupling units 12 and to actuate a warning or alarm means or unit 13 in response to a marked inductance change. In this embodiment, an alarm lamp or a buzzer is employed as the warning or alarm unit 13.

Figure 2:
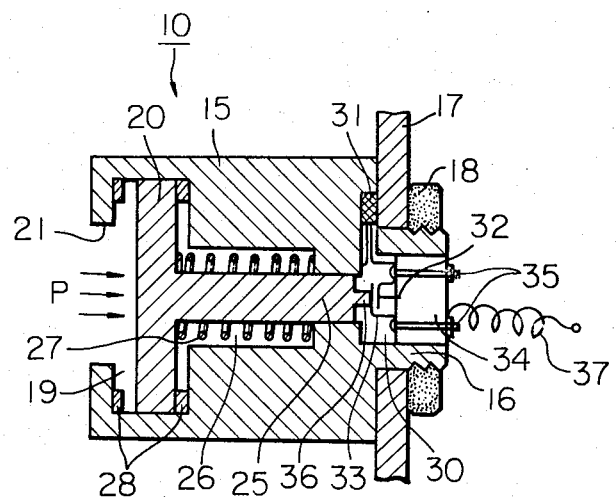
FIG. 2 is a longitudinal section of a sensor unit employed in the device of FIG. 1.

Referring to FIG. 2, the sensor unit 10 as depicted includes a generally cylindrical casing 15 having a threaded end 16 which fits into an opening in the wheel rim 17 so as to be secured thereon by means of a nut 18. It will be understood that the invention is described as applied to a tubeless tire, which is mounted on the rim in such a manner that the air is retained between the rim and the tire casing, as is best shown in FIG. 6.

The casing 15 has a chamber 19 within which a pressure-sensitive piston head 20 is mounted for axial sliding movement therein. The chamber 19 opens to the interior of the tire casing (not shown) through an opening 21 in the casing 15, so that the piston head 20 is subject to the air pressure in the tire casing.

A piston rod 25 is secured to or formed integral with the piston head 20 and extends axially and centrally through the casing 15 toward the threaded end 16. As shown, the chamber 19 also extends axially through the casing 15, forming a chamber 26 in which a spring 27 is mounted. The spring 27 serves to bias the piston head 20 in a left-hand direction as viewed in FIG. 2. In order to prevent leakage of air into the chamber 26, two annular seals 28 are mounted within the chamber 19 in a conventional manner.

The casing 15 also has a bore 30 formed in the threaded end 16 to accommodate a contact assembly and a PTC (Positive Temperature Coefficient) thermistor 31 of the sensor unit 10. The contact assembly comprises a fixed contact 32 and a movable contact 33, both being secured at their one ends on an insulating member 34 fitted into the bore 30, by means of bolt and nut assemblies 35. The piston rod 25 has its tip 36 extending into the bore 30, and the tip 36 is adapted to urge the movable contact 33 in the right-hand direction, that is, toward the fixed contact 32, as the air pressure in the tire increases, moving the piston rod 25 in the right-hand direction against the action of the spring 27. The strength of the spring 27 is so selected that when the air pressure exceeds the predetermined value the movable contact 33 engages the fixed contact 32 by the piston rod 25. Thus, it will be understood that the fixed and movable contacts 32 and 33 are engaged when the air pressure is above the predetermined value, while they are disengaged when the air pressure is below the predetermined value, that is, during the abnormal conditions.

The thermistor 31 is of a conventional PTC type having resistance-temperature characteristics as shown in FIG. 3. The thermistor of this type exhibits a resistance change as great as $10^3$ fold within a temperature change of approximately 10°C. Thus, by employing such a thermistor having the critical temperature T°C approximately equal to the predetermined temperature, it is possible to detect the tire temperature reaching the predetermined temperature above which the abnormal condition in the tire is deemed to exist. As described above, the resistance change is so great that it can be thought that the thermistor 31 virtually acts as a switch the resistance of which changes from zero to infinite upon being rendered off.

The thermistor 31 is securely mounted within the bore 30 and has one lead connected to the same bolt as that securing the fixed contact 32. The other lead of the thermistor 31 is electrically connected to the casing 15 and thus grounded to the body of the vehicle. Although the thermistor 31 is positioned so as to sense the temperature of the wheel rim, it will be appreciated that the temperature of the rim is substantially equal to the tire temperature. Connections to the electromagnetic coupling unit 12 may be made by connecting the bolt securing fixed contact 32 to the unit 12 through a conductor 37.

The thermistor 31 and the pressure switch 38 including the fixed and movable contacts 32 and 33 are connected in series between the conductor 37 and the ground, as is shown in FIG. 4. Since, as described above, the thermistor 31 virtually acts as a switch, the circuit of FIG. 4 can be modified to that shown in FIG. 5 in which the thermistor 31 is represented by a temperature switch 31a. In this connection, it should be understood that a bimetal may be employed in place of the thermistor 31. As previously described, the pressure switch 38 opens when the air pressure in the tire casing is below the predetermined value, and closes when the air pressure is above the predetermined value.

Referring to FIG. 6, there is shown one preferred embodiment of the electromagnetic coupling unit 12 for coupling the sensor unit 10 to the inductance change detector 11. The electromagnetic coupling unit 12 comprises a primary coil 40 and a secondary coil 41 which are positioned in concentric relation to each other. The secondary coil 41 is secured on the axle 42 concentrically with respect to the axis thereof for rotation therewith. One end of the secondary coil 41 is connected through conductor 37 to the sensor unit 10 secured on the tire assembly comprising the tire (no numeral) and a wheel rim 17, and the other end thereof is grounded.

The primary coil 40 is carried by a supporting member 43 which in turn is secured on a journal member 44 by means of bolt-nut assemblies 45. The journal member 44 is supported by the frame 46 of the vehicle and is adapted to support the axle 42 for free rotation therein. As mentioned above, the primary coil 40 is positioned concentrically with respect to the secondary coil 41. The primary coil 40 is connected at one end to the inductance change detector 11 through a conductor 47 and at the other end to the journal member 44 and thus grounded.

Having described the general construction of the sensor unit 10 and the electromagnetic coupling unit 12 as set forth in FIGS. 2, 4, 5 and 6, attention will be directed to the operation of these two units in the detection of the abnormal conditions in the tire. By way of illustration, the electromagnetic coupling unit 12 and the sensor unit 10 are diagrammatically shown in FIG. 7. Let it be assumed that a current $I_1$ flows through the primary coil 40, causing a magnetic flux $\phi_1$ to be formed. Then, due to the action of electromagnetic induction, a current $I_2$ is caused to flow through the secondary coil 41 in a direction to produce a magnetic flux $\phi_2$ of the opposite direction to $\phi_1$. If the two serially connected switches 31 and 38 are both closed, which means that the tire is in normal condition, the absolute values of the magnetic fluxes $\phi_1$ and $\phi_2$ are equal to each other. Thus, the inductance of the primary coil 40 during the normal condition of the tire, $L_N$ is given by the following expression:

$$L_N = (\phi_1 - \phi_2)/I_1 \approx 0$$

If, on the other hand, abnormal condition exists, causing either one of the two switches 31 and 38 to open, there is no current flowing through the secondary coil 41. It follows that the magnetic flux $\phi_2$ equals zero. In this case, the inductance $L_{AB}$, under abnormal conditions, of the primary coil 40 is as follows:

$$L_{AB} = \phi_1/I_1$$

Although, in practice $L_N$ is not equal to zero because of the presence of a leakage flux and the resistances of coil 41 and thermistor 31, the following inequality: $L_{AB} > L_N$ will hold. As explained above, it is understood that the inductance of the primary coil 40 is greater during the abnormal conditions than during the normal conditions. Experiments have revealed that $L_{AB}$ is approximately two times as great as $L_N$.

Figure 8:
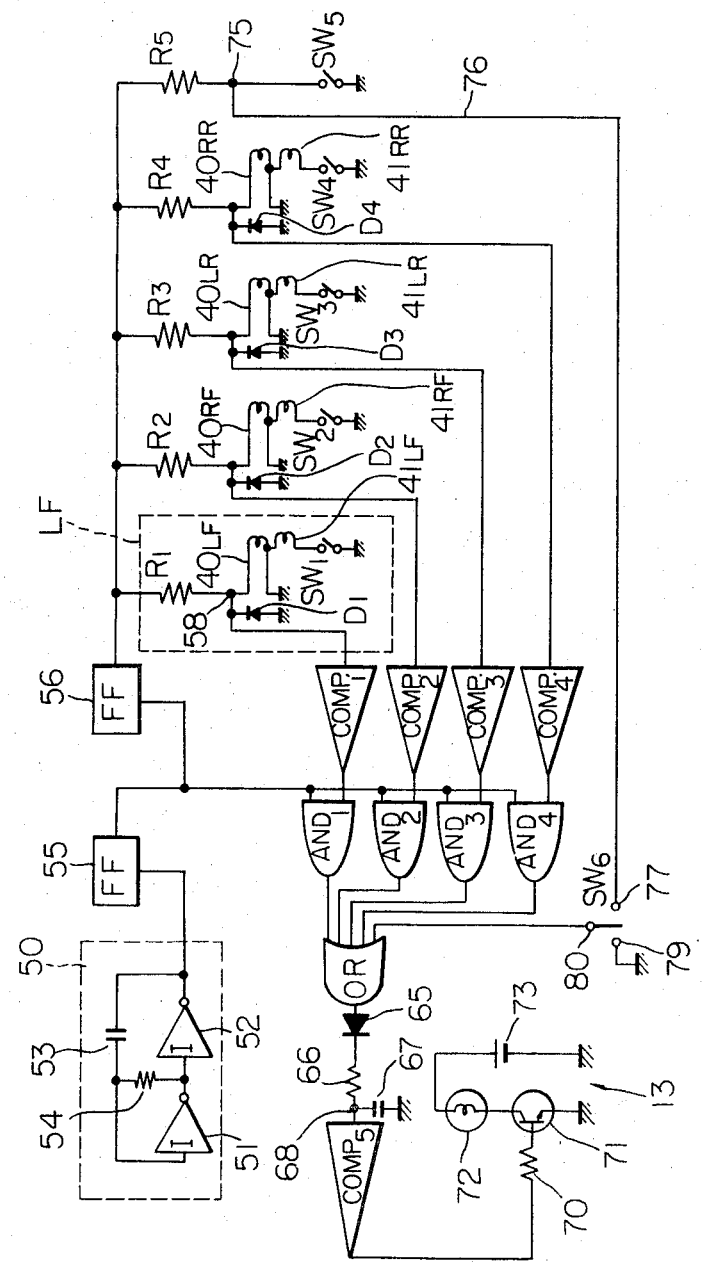
FIG. 8 is a circuit diagram of the device of FIG. 1.

Referring to FIG. 8, there is shown an example circuit of the inductance change detector 11 and the alarm unit 13. The waveforms appearing at various points in the circuit of FIG. 8 are illustrated diagrammatically in FIG. 9.

Shown in the right half portion of FIG. 8 are four sets of primary coils $40_{LF}$ to $40_{RR}$ and secondary coils $41_{LF}$ to $41_{RR}'$ which comprise the electromagnetic coupling units 12 for the respective tires. The pressure switch 38 and the temperature switch 31 as described above are represented by five single switches $SW_1$ to $SW_5$ by way of simplicity of illustration, the switches SW being shown as provided one for each tire.

A clock pulse generator 50 is shown in the upper left portion of FIG. 8, as enclosed within a broken line rectangle. The clock pulse generator 50 is of the conventional type comprising inverters 51 and 52, a capacitor 53 and a resistor 54, and produces clock pulses having a repetition period $t_{cp}$, as is shown in FIG. 9(A). The clock pulses derived from the generator's output are supplied to the following flip-flop (FF) 55 for frequency division. The flip-flop 55's output, the waveform of which is shown in FIG. 9(B), is also supplied to another flip-flop 56 for further frequency division. The rectangular output of the flip-flop 56 is shown in FIG. a(c) and is fed through resistors $R_1$ to $R_4$ to their associated primary coils $40_{LF}$ to $40_{RR}$. Since the mechanism for detecting the abnormal conditions is identical irrespective of the location of a tire, the operation of the present device will be described hereinafter in conjunction with the left front tire LF.

As will be seen from FIG. 8, the resistor $R_1$ and the primary coil $40_{LF}$ are connected in series with each other, and therefore the waveform appearing at a point 58 therebetween is that as shown in FIG. 9(D). In the figure, the level as indicated at $V_{comp\ 1}$ is a predetermined voltage level, with which the voltage at point 58 is to be compared in a comparator, generally designated by COMP 1. A diode $D_1$ is connected between the point 58 and the ground for the purpose of clipping off the voltage waveform at 58 below the ground level.

In FIG. 9, let it be assumed that the tire LF be in normal condition until a point of time $t_0$ is reached and that at that point $t_0$ the abnormal conditions in the tire, such as too low air pressure and/or excessive tire temperature, start to occur. Since the inductance of the primary coil $40_{LF}$ increases upon the commencement of the abnormal conditions, as described in connection with FIG. 7, the slope of the decreasing voltage at point 58 decreases, as is seen from FIG. 9(D). It follows that the rectangular pulses derived from the output of the comparator COMP 1 become wider, as is shown in FIG. 9(E). Now, by properly selecting the voltage level $V_{comp\ 1}$, it will be possible to adjust the width of the rectangular pulses so as to be $0.8 \times t_{cp}$ in normal condition and $1.6 \times t_{cp}$ in abnormal condition.

Turning back to FIG. 8, the rectangular outputs of the comparators COMP 1 through 4 are supplied to one input of their associated AND gates $AND_1$ through $AND_4$. Each of the AND gates also has the other input connected to the output of the flip-flop 55 so as to be supplied with the pulses as shown in FIG. 9(B). Comparing the pulses shown in FIGS. 9(B) and (E) with particular reference to their relative position, it will be seen that in normal condition coincidence does not occur but that in abnormal condition they coincide with each other for a time period $0.6 \times t_{cp}$ because of the fact that each pulse is widened so as to have a width $1.6 \times t_{cp}$. Thus, as is shown in FIG. 9(F), the AND gates 1 through 4 produce at their outputs rectangular signals having the same pulse width $0.6 \times t_{cp}$ in response to the coincidence of the pulses shown in FIGS. 9(B) and (E). The AND gates's outputs are supplied through an OR gate and a diode 65 to an integrator circuit comprising a resistor 66 and a grounded capacitor 67. As is shown in FIG. 9(G), the voltage at a point 68 (FIG. 8) between the resistor 66 and capacitor 67 increases gradually, as any f the AND gates $AND_1$ through $AND_4$ starts to produce a coincidence output which indicates an abnormal condition in the tire. The voltage at point 68 is supplied to a comparator COMP 5 for comparison with a predetermined level $V_{comp\ 5}$. At time $t_1$ when the voltage at 68 exceeds the predetermined level $V_{comp\ 5}$, the comparator COMP 5 produces an output voltage, the waveform of which is shown in FIG. 9(H), the output voltage being supplied through a resistor 70 to the alarm unit 13. In the illustrated embodiment, the alarm unit 13 comprises a transistor 71 having its base connected to the resistor 70 and its emitter grounded. The collector of the transistor 71 is connected to an alarm lamp 72 which in turn is connected to a battery 73. When the transistor 71 is rendered conductive in response to the rise in the output voltage of the comparator COMP 5, the alarm lamp 72 is lighted, indicating the occurrence of the abnormal conditions in any of the four tires.

The mechanism for detecting abnormal conditions in the spare tire SP will be described hereinafter in detail. Referring to FIG. 8, the output of the flip-flop 56 is connected also to the sensor unit 10 for the spare tire through a resistor $R_5$. A point 75 between the sensor 10 and resistor $R_5$ is connected by a conductor 76 to one fixed contact 77 of a switch $SW_6$, an other fixed contact 79 of which is grounded. The switch $SW_5$ as shown represents the pressure switch 38 and the temperature switch 31 for the spare tire, by way of simplicity of illustration. A movable contact 80 of the switch $SW_6$ is connected to one input of the OR gate previously described. The movable contact 80 usually engages the fixed contact 77, so that the sensor unit 10, that is, $SW_5$ is connected to the OR gate.

In normal condition, the switch $SW_5$ remains closed, thus causing no voltage signal to be transmitted through the OR gate to the alarm unit 13. when the spare tire falls in an abnormal condition, the switch $SW_5$ is caused to open, so that the flip-flop 56's output as shown in FIG. 9(C) is supplied to the OR gate without being grounded. The output is then supplied to the integrator and thereafter to the comparator COMP 5, thus actuating the alarm unit 13. If the movable contact 80 of the switch $SW_6$ engages the other fixed contact 79, the opening and closure of $SW_5$ for the spare tire have no effect upon the actuation of the alarm unit 13, so that even in an abnormal condition the alarm unit 13 remains deenergized. The switch $SW_6$ is adapted to be manually or automatically operated to cause the movable contact 80 to engage the fixed contact 79, upon existence of abnormal conditions in the spare tire.

As has been described above, the present invention provides an improved device for automatically detecting abnormal conditions in vehicle tires including the spare tire. The principles of the invention may also be utilized in a vehicle equipped with double wheels and tires, as those on trucks or buses, in which case it will be advantageous to have one sensor unit for each of the double tires connected in series with each other, so that abnormal conditions in one of the double tires actuate the alarm unit. Further, it would also be advantageous to provide one alarm unit for each tire. Although in the illustrated embodiment a change of inductance is utilized to detect the abnormal conditions in the tires, it will be appreciated that a modification in which an oscillation circuit utilizing LC resonance is employed in combination with a frequency-to-voltage conversion circuit is also possible. Further, an AC bridge circuit can also be employed to detect the abnormal conditions.

The present invention offers many advantages over similar devices in the prior art. One advantage lies in the ability to detect the abnormal conditions in vehicle tires irrespective of whether the vehicle is running or stationary. Another advantage lies in the fact that, since it is possible to double the available inductance, the circuit for detecting the inductance change is relatively simple in construction and reliable in operation. In addition, the electromagnetic coupling unit having no contacting portions is excellent in durability. Moreover, due to the simple construction of the pressure switch in which two electric contacts are engaged or disengaged with each other as the air pressure changes, there is little likelihood that the operation of the device is affected by the centrifugal force applied thereto. Further, since the sensor unit is relatively light, the provision of such unit on a tire does not unbalance the tire.

What is claimed is:

1. In a device for automatically detecting the loss of pressure and the abnormal increase of temperature within a pneumatic tire of wheeled vehicle, having a normally closed pressure switch to be opened when pressure in the tire is below a predetermined pressure value; a normally closed temperature switch to be opened when temperature of the tire is above a predetermined temperature value; coupling means comprising a primary coil and a secondary coil, the secondary coil being secured concentrically on an axle of the vehicle for rotation therewith and being electrically connected in series with said pressure switch and said temperature switch, the primary coil being secured rigidly with respect to the frame of the vehicle and concentrically with respect to the secondary coil so that the primary coil exhibits an inductance change upon open of said switches; and warning means:

a clock pulse generator to produce clock pulses;

a first flip-flop connected to said clock pulse generator for providing, as its output, frequency division of said clock pulses;

a second flip-flop connected to said first flip-flop for providing, as its output, further frequency division of said clock pulses;

resistor electrically connecting said second flip-flop to said primary coil of said coupling means;

comparator gate means responsive to a voltage at a junction point between said resistor and said primary coil of said coupling means for providing a pulse output when said voltage is above a reference voltage;

AND logical function gate means connected to said first flip-flop and to said comparator gate means to receive outputs thereof, respectively, said AND logical function gate means being operable to provide a pulse output responsive to coincidence of inputs thereto; and means responsive to said output pulse of said AND logical function gate means for energizing said warning means.

2. A device as claimed in claim 1 in which said normally closed temperature switch is in the form of a thermistor, said thermistor having its critical temperature approximately equal to a predetermined temperature above which the tire is deemed to be in the abnormal condition.

3. A device as claimed in claim 1 in which said normally closed temperature switch is in the form of a bimetal.

* * * * *